United States Patent [19]

Lee

[11] Patent Number: 4,731,211

[45] Date of Patent: Mar. 15, 1988

[54] CELLULAR THERMOSETTING FLUOROPOLYMERS AND PROCESS FOR MAKING THEM

[75] Inventor: Sheng Y. Lee, Silver Spring, Md.

[73] Assignee: The United States of America as represented by the Administrator of the National Aeronautics and Space Administration, Washington, D.C.

[21] Appl. No.: 867,987

[22] Filed: May 29, 1986

[51] Int. Cl.$^4$ .................................. C08J 9/04
[52] U.S. Cl. .................... 264/50; 264/DIG. 64; 425/4 R
[58] Field of Search .................. 521/145, 82, 97, 178; 264/50, DIG. 64

[56] References Cited

U.S. PATENT DOCUMENTS

| | | | |
|---|---|---|---|
| 3,206,482 | 9/1965 | Bright | 521/178 |
| 3,268,619 | 8/1966 | Nametz | 521/178 |
| 3,282,863 | 11/1966 | Carey et al. | 521/178 |
| 3,355,306 | 11/1967 | Krol | 521/178 |
| 3,476,693 | 11/1969 | Mango et al. | 521/178 |
| 3,519,697 | 7/1970 | Price | 521/178 |
| 3,692,710 | 9/1972 | Lorcher et al. | 260/2.5 L |
| 4,029,612 | 6/1977 | Collington | 521/145 |
| 4,292,413 | 9/1981 | Blount | 521/178 |
| 4,394,460 | 7/1983 | Chung et al. | 521/145 |

OTHER PUBLICATIONS

"Epoxy Resins" by Henry Lee, American Chem. Society, Copyright 1970, pp. 8–15.
Dialog Information Services, Inc. Chemical Abstracts Service Using the Chemical Abstract Search Database Using Fluoropolymer Foam and Cellular Descriptors.

*Primary Examiner*—Morton Foelak
*Attorney, Agent, or Firm*—R. Dennis Marchant; John R. Manning; Ronald F. Sandler

[57] ABSTRACT

Thermosetting fluorodiepoxide polymer foams are made by mixing fluid form thermosetting fluorodiepoxide polymer components having a substantial fluorine content, placing the mixture in a pressure tight chamber, filling the chamber with a gas, at relatively low pressure, that is unreactive with the fluorodiepoxide polymer components, allowing the mixture to gel, removing the gelled fluorodiepoxide polymer from the chamber and thereafter heating the fluorodiepoxide polymer at a relatively low temperature to simultaneously cure and foam the fluorodiepoxide polymer. The resulting fluorodiepoxide polymer product is closed celled with the cells storing the gas employed for foaming.

9 Claims, No Drawings

4,731,211

CELLULAR THERMOSETTING FLUOROPOLYMERS AND PROCESS FOR MAKING THEM

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention pertains to fluoropolymers and, more particularly, to cellular thermosetting fluorodiepoxide polymer and the method of making them.

BACKGROUND ART

Numerous fluoropolymers such as TEFLON, e.g. PTFE, FEP, PFA are now very widely used for coatings, electrical insulation and as structural components due to their superior properties in the areas of hydrophobicity, chemical and thermal stability and electrical insulation. For some applications, fluoropolymers in cellular or foam form are particularly desirable because of their weight, dielectric constant and dissipation factor. In terms of cost savings, the foams are preferred to the non-foams because less fluoropolymer material is used. These properties are often taken advantage of when using fluoropolymer foams in the production of wire products such as coaxial cables and power lines. The applications for these foams may be expanded as the manufacturing processes are improved.

Generally these prior art foams are made by processes which include mixing a thermoplastic fluoropolymer, in granular or powder form, with a blowing agent, such as a FREON or diisopropyl hydrazinedicarboxylate, and placing the mixture in a mold. The mold is heated to a very high temperature, for example 240° C. or higher, and subjected to a very high pressure in the order of 1500 psi. After the fluoropolymer reaches a very high temperature it becomes fluid and is moldable and foamable. A variety of methods, including the addition of additives such as nucleation agents, may be employed to facilitate the formation of a particular cell structure.

One example of the prior art in cellular fluoropolymers includes mixtures of polymers or copolymers of perfluorolfins with predetermined amounts of a hydroxyl substituted hydrocarbon. In particular, an aqueous dispersion of a sulfonated lauryl alcohol oxethylate and glycerol, a gas foaming agent, and polytetrafluoroethylene (PTFE), is whipped until it appears as a stiff foam which is then heat-treated and finally sintered by placing the foam into a 400° C. oven where the foaming agent is evaporated and the plastic hardened. The final product is an open-cell thermoplastic.

One problem with the prior art foamed fluoropolymers is that the methods of making them often employ blowing agents, nucleating agents, and other additives which may leave undesirable residues, in terms of a particular application, in the foam products in their final form. More importantly, the prior art is restricted to thermoplastic fluoropolymers products which are formed by very high temperature sintering processes which are incompatible with the coating of encapsulation of temperature sensitive parts, including some electronics parts.

STATEMENT OF THE INVENTION

Accordingly, it is an object of the invention to provide thermosetting fluorodiepoxide polymer foams.

It is another object of the invention to provide a process for making thermosetting fluorodiepoxide polymer foams.

It is yet another object of the invention to provide a fluorodiepoxide polymer foam with a predetermined gas that is stored in a closed cell structure.

It is still another object of the invention to provide a fluorodiepoxide polymer foam without undesirable residues.

It is a yet further object of the invention to provide a low temperature process for making a fluorodiepoxide polymer foam.

Briefly, these and other objects are achieved by providing a thermosetting fluorodiepoxide polymer foam product made by mixing a thermosetting fluorodiepoxide polymer with an effective curing agent, placing the mixture in a chamber, filling the chamber with a predetermined gas that normally is one that does not react with the fluorodiepoxide polymer-curing agent mixture, operating the chamber for a sufficient period of time at relatively low temperature and pressure until the mixture is partially cured or gelled and the gas is trapped within the mixture and, thereafter, removing the gas source and, then heat-curing the gelled polymer to form a closed cell product with the predetermined gas stored in the closed cells.

DETAILED DESCRIPTION OF THE INVENTION

The invention includes any cellular thermosetting fluorodiepoxide polymer product and the process of making these products, which process, for all the products, will be essentially the same. The thermosetting fluorodiepoxide polymer systems have the same fundamental characteristics, i.e., a fluorodiepoxide polymer resin is provided which can be cured to form a cross-linked solid polymer, by its mixture with a curing agent, a catalyst or both. The mixture then cures at a rate which is determined as a function of temperature. For many systems, room temperature is often sufficient for the mixture to gel or set. The full cure often is completed by subjecting the mixtures to a higher temperature. The curing temperature, which also functions to produce the foam structure, is related to the degree of cure in the gel. This type of thermosetting fluorodiepoxide polymer system is to be distinguished from a thermoplastic fluoropolymer system which does not ever cure in a traditional sense, it only melts when heated to a high temperature and hardens when cooled. As previously noted, possible problems with creating a foam with a thermoplastic system, as opposed to a thermosetting system and depending on the particular application, are the creation of undesirable residues resulting from the use of some of the traditional blowing agents and additives which are employed in thermoplastic fluoropolymers processes and the fact that foaming can only take place when the thermoplastic fluoropolymer material is fairly fluid, which, for these materials, is at a very high temperature. In contradistinction, thermosetting fluorodiepoxide polymer are fluid at or near room temperature when the fluorodiepoxide polymer and curing agent are first mixed, fluid being defined for this purpose, as prior to any gellation. While the thermosetting fluorodiepoxide polymer is in the fluid state, a predetermined unreactive gas can be dispersed into the chamber and into the fluid mixture under a moderate pressure. The gas will be trapped in the gelled polymer and foam the polymer when it is heat-cured. One example of such a thermosetting fluorodiepoxide polymer is made from the following fluorodiepoxide:

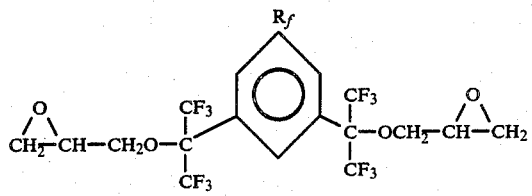

which may be cured by a curing agent such as an adduct amine with the formula:

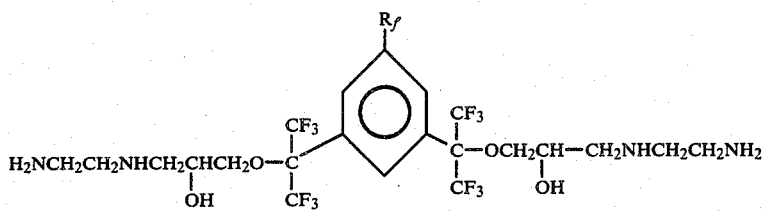

Both of these compounds were developed at the U.S. Naval Research Laboratory. The adduct amine may be readily prepared by the known method of reacting a diepoxide with an excess of an diamine. In this case, $C_n$-fluorodiepoxide is reacted with an excess of ethylenediamine.

The fluorine content of these fluoroepoxy formulations varies with the size of the perfluoroalkyl groups, $R_f$ and $R_f'$. When these groups are large, the fluorine content of the formulation, in terms of weight, will be high, perhaps in the order of 50% or higher. A high fluorine content results in fluorodiepoxide polymer system with a novel property which makes it possible to disperse a gas into the fluorodiepoxide polymer, curing agent mixture under a moderate pressure. The above-noted highly fluorinated, two-component formulated fluoroepoxy compound may be viscous but it is easy to remove a gas, such as air, by evacuation, which is introduced while mixing the two components. Just as it is easy to remove the gas from the compound, gas can also be readily dispersed into the fluorodiepoxide polymer compound under a moderate pressure.

The general process used for producing thermosetting fluorodiepoxide polymer products may be described as follows:

(1) Mix the thermosetting fluorodiepoxide polymer fluid form components which usually comprise a resin and a curing agent or a catalyst, or both.
(2) Deaerate the mixture in a vacuum.
(3) Place the fluid mixture in a chamber which is structured to contain a gas under pressure.
(4) Fill the chamber with a gas that will not react with the mixture. Typically the gas pressure in the chamber may reach several atmospheres. Note: The depth of foaming will vary with a variation of pressure and/or gas type. (More pressure, greater depth.)
(5) Allow the mixture to gel or partially cure, normally at or near room temperature. When the mixture is gelled, the gas is trapped in the polymer.
(6) Remove the gelled fluorodiepoxide polymer from the chamber (or relieve the pressure in the chamber). Note: If the gas is removed before the mixture is sufficiently gelled, the formerly trapped gas will rupture any cell structure which has started to form.
(7) Heat-cure the gelled fluorodiepoxide polymer. The polymer will foam while heating during the final cure step of the process.

Several important aspects of the invention are worthy of note at this point. Foaming with an unreactive gas has been noted and it is anticipated that for most applications a completely unreactive gas will be favored. However, for some applications, a gas which is not completely unreactive may be employed so long as it does not inhibit the curing process. In the instant process, the entrapment of the gas in the resin-curing agent mixture is completely unexpected because traditional physical concepts would lead one to believe that the application of pressure with a gas would squeeze any gas out of the resin-curing agent mixture rather squeezing the applied gas into the mixture. Again, it should be emphasized that this unexpected result only appears to occur when the fluorine content of the mixture, by weight, is somewhere between 30% and 40%, or higher. When this condition is met, the reaction with an unreactive gas is completely physical, not chemical, and completely predictable as well. In other words, as long as a substantially unreactive gas is employed with a thermosetting fluorodiepoxide-curing agent mixture that has a high enough fluorine content, the inventive process will work to produce the inventive product.

The following are some specific examples of foaming processes for making thermosetting fluorodiepoxide polymer products.

EXAMPLE NO. 1

A fluid compound was prepared by mixing, in a container, 10.0 g. of the diglycidyl ether of 1,3-bis(2-hydroxy-hexafluoro-2-propyl)-5-heptadecafluoroctylbenzene (designated as C8-fluorodiepoxide) and 3.4 g (a stoichiometric amount) of the adduct amine of C6-fluorodiepoxide with ethylenediamine (designated as C6-adduct amine). After deaerating under a vacuum, the compound was placed in a pressure chamber and the chamber was filled with oxygen from a compressed oxygen gas cylinder to a pressure of 45 psi. After 12 to 24 hrs. in the chamber at room temperature, the compound gelled to a transparent solid. The solid foamed to produce a cellular piece with oxygen stored in the resulting closed cell structure when it was removed from the pressurized chamber and cured at 70° C. for 2 hrs. The fluorine content of this fluorodiepoxide polymer-curing agent mixture was 56%.

EXAMPLE NO. 2

The procedure of Example No. 1, including the materials acted upon, was repeated except that compressed nitrogen was substituted for the oxygen and nitrogen was now stored in the cells of the final product.

EXAMPLE NO. 3

A fluid compound was prepared by mixing 10.0 g. of C6-fluorodiepoxide and 1.48 g. of 1,3-bis(-aminopropyl)-tetramethyldisiloxane. After deaerating under vacuum, the compound was placed in a pressure chamber and the chamber was filled with nitrogen gas to a pressure of 75 psi. After 24 hrs. at room temperature, the compound gelled and foamed when it was cured at 70° C. for 2 hrs. after removal from the chamber. This compound had a 40% fluorine content.

The short form designations of the above-noted fluorodiepoxides may be better understood from the general fluorodiepoxide formula:

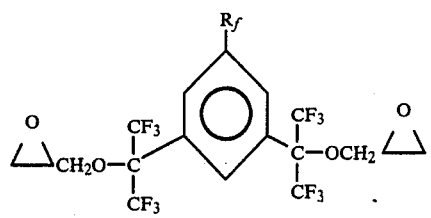

where $R_f$ can generally be set forth as $R_f = C_n F_{2n+1}$ which corresponds to a short form fluoroepoxy designation of $C_n$-fluorodiepoxide. Where $R_f$ equals $C_8F_{17}$ the designation is C8-fluorodiepoxide and where $R_f$ equals $C_6F_{13}$ designation is C6-fluorodiepoxide.

The methods illustrated by the examples noted above used C8- and C6-fluorodiepoxides. It is chemically extendable to all of the homologues represented by the general formula $C_nF_{2n+1}$ for $R_f$ in the flurodiepoxide structural formula. Additionally, the curing agents for the fluoropoxies are not limited to the amines given above. Any curing agent can be employed which is compatible with the fluoroepoxy resin mixture to form a fluid compound with a total fluorine content not less than between 30% and 40% by weight or higher.

The gases employed for the foaming process may be chosen to perform a specific function in addition to foaming. For example, oxygen may be chosen to produce oxidation or combustion, sulfur hexafluoride ($SF_6$) may be chosen to increase the dielectric properties of the foamed products made by the invention. Additionally, radioactive gases may be used.

I claim:

1. A process for making thermosetting fluorodiepoxide polymer foam products including the steps of:
   mixing, in fluid form, thermosetting fluorodiepoxide polymer components, said components having a fluorine content, by weight, of 30% or higher, including a thermosetting fluorodiepoxide polymer resin and a curing agent or a catalyst, or both, which is, or are, effective for curing said resin;
   placing said fluid mixture into a substantially pressure tight chamber;
   filling said chamber with a substantially unreactive gas;
   allowing sufficient time for said mixture to gel, to trap said gas in the resulting fluorodiepoxide polymer;
   relieving the pressure on said gelled polymer;
   heating said fluorodiepoxide polymer; to simultaneously cure and foam said fluorodiepoxide polymer.

2. The process of claim 1 wherein said chamber is evacuated prior to filling said chamber with said unreactive gas.

3. The process of claim 1 wherein said curing agent is an adduct amine of said fluorodiepoxide.

4. The process of claim 1 wherein said gas is air.

5. The process of claim 1 wherein said gas is oxygen.

6. The process of claim 1 wherein said gas is nitrogen.

7. The process of claim 1 wherein said chamber is pressurized to several atmospheres when filling the chamber with said gas.

8. The process of claim 1 wherein said final heating step takes place at a temperature which is substantially lower than temperatures employed for foaming thermoplastic fluoropolymers.

9. The process of claim 1 wherein said gelled fluorodiepoxide polymer is removed from said chamber prior to heating.

* * * * *